(12) United States Patent
Hosain

(10) Patent No.: US 6,542,730 B1
(45) Date of Patent: Apr. 1, 2003

(54) SYSTEM AND METHOD FOR DISABLING A CELLULAR PHONE

(75) Inventor: Syed Zaeem Hosain, San Jose, CA (US)

(73) Assignee: Aeris.Net, San Jose, CA (US)

( * ) Notice: Subject to any disclaimer, the term of this patent is extended or adjusted under 35 U.S.C. 154(b) by 0 days.

(21) Appl. No.: 09/435,239

(22) Filed: Nov. 5, 1999

Related U.S. Application Data

(60) Provisional application No. 60/107,491, filed on Nov. 6, 1998.

(51) Int. Cl.[7] ................................................. H04M 1/66
(52) U.S. Cl. ....................... 455/410; 455/411; 455/419; 455/420
(58) Field of Search ............................. 455/403, 410, 455/411, 466, 26.1, 550, 575, 435, 418, 419, 420; 340/5.3, 5.31, 5.8

(56) References Cited

U.S. PATENT DOCUMENTS

| | | | |
|---|---|---|---|
| 5,274,368 A | * | 12/1993 | Breeden et al. ............. 455/410 |
| 5,509,075 A | * | 4/1996 | Grube et al. ................. 455/410 |
| 5,600,708 A | * | 2/1997 | Meche et al. ................ 455/411 |
| 5,625,671 A | * | 4/1997 | Salin ........................... 455/411 |
| 5,659,595 A | * | 8/1997 | Chanu et al. ................ 455/411 |
| 5,734,978 A | * | 3/1998 | Hayatake et al. ........... 455/411 |
| 5,898,783 A | * | 4/1999 | Rohrbach .................... 455/411 |
| 5,907,804 A | * | 5/1999 | Schroderus et al. ........ 455/411 |

* cited by examiner

*Primary Examiner*—Quochien Vuong

(57) ABSTRACT

A system and method for temporary or permanent disabling of a cellular control device is described. A cellular control module is responsive to either a temporary disable command or a factory disable command received over a cellular control channel. The cellular control module is responsive to an enable command received over the cellular control channel if the cellular control module was previously temporarily disabled by a temporary disable command. The cellular control module includes disable logic to respond to a temporary disable command, and disable logic to respond to a factory disable command.

21 Claims, 8 Drawing Sheets

| Value | Action |
|---|---|
| 0 | Default operation. The MIN, slot number, and Action byte value are reported on the Data Interface, *regardless* of the corresponding Control byte bit 0 and 1 settings, and no further action is taken. |
| 1 | Transmit current reading of internal 32 bit counter over the air, including logic levels of I/O pins. |
| 2 | Reset internal 32 bit counter to zero. |
| 3 | Transmit logic levels (state) of input pins, A and B, over the air. |
| 4 | Set output pin A high. |
| 5 | Set output pin A low. |
| 6 | Set output pin B high. |
| 7 | Set output pin B low. |
| 8 | Set both output pins A *and* B high. |
| 9 | Set both output pins A *and* B low. |
| 10 | Enter low-power "sleep" mode until woken up by an instruction on the Data Interface. |
| 11 | Use the block "A" frequencies only. |
| 12 | Use the block "B" frequencies only. |
| 13 | Transmit current data buffer contents. |
| 14 | Clear data buffer. |
| 15 | Set system preference to Normal mode (first tune to home block, then search alternate block). |
| 16 | Set system preference to Home only mode (only operate if system is same as stored SID). |
| 17 | Request Audit response. |
| 18 | Enable Serving System Detection control (see section on A/B Switching Support) |
| 19 | Disable Serving System Detection control (see section on A/B Switching Support) |
| 20 | Enable Module 1 (if disabled by the next action '21') |
| 21 | Disable Module 1 (can be re-enabled by action '20'). The Module does not allow the serial Data Interface to request transmissions. However, it will register, and continue to listen to FOCC transmissions, and respond to FMTP device control instructions—particularly the '20' Enable Module 1 instruction. The Module can also be enabled by a serial Data Interface instruction. |
| 22 | Enable Module 2 (if disabled by the next action '23'). |
| 23 | Disable Module 2 (can *only* be re-enabled by action '22' sent via an FMTP page). The Module does not allow the serial Data Interface to request transmissions. However, it will register, and continue to listen to FOCC transmissions, and respond to FMTP device control instructions—particularly the Enable Module 2 instruction '22.' The Module cannot be enabled by any serial Data Interface instruction. |
| 24 | Request a Parameter Update response. |
| 24-61 | Reserved |
| 62 | Initialize the Module ("cold boot"). Resets the counter to zero, sets output pins low and resets the Module. |
| 63 | Reset the Module ("warm boot"). Saves the counter value, and resets the Module. |

FIG. 5

| Description | Cmd | Digit 1 | Digit 2 | Digit 3 | Digit 4 | Digit 5 | Digit 6 | Digit 7 | Digit 8 | Digit 9 | Digit 10 | Digit 11 | Digit 12 |
|---|---|---|---|---|---|---|---|---|---|---|---|---|---|
| Set Time | 0 | H1 | H2 | M1 | M2 | — | — | — | — | — | — | — | — |
| Set Date | 1 | MO1 | MO2 | DY1 | DY2 | — | — | — | — | — | — | — | — |
| Set Home SID | 2 | SD1 | SD2 | SD3 | SD4 | — | — | — | — | — | — | — | — |
| Device Control | 3 | F1 | F2 | A1 | A2 | — | — | — | — | — | — | — | — |
| Data 1 (4 digit) | 4 | D1 | D2 | D3 | D4 | — | — | — | — | — | — | — | — |
| Data 2 (4 digit) | 5 | D1 | D2 | D3 | D4 | — | — | — | — | — | — | — | — |
| Data 3 (8 digit) | 6 | D1 | D2 | D3 | D4 | D5 | D6 | D7 | D8 | — | — | — | — |
| Data 4 (12 digit) | 7 | D1 | D2 | D3 | D4 | D5 | D6 | D7 | D8 | D9 | D10 | D11 | D12 |
| Reserved | 8 | — | — | — | — | — | — | — | — | — | — | — | — |
| Reserved | 9 | — | — | — | — | — | — | — | — | — | — | — | — |

FIG. 7

| Description | Cmd | Digit 1 | Digit 2 | Digit 3 | Digit 4 |
|---|---|---|---|---|---|
| Set Time | 0 | H1 | H2 | M1 | M2 |
| Set Date | 1 | MO1 | MO2 | DY1 | DY2 |
| Set Home SID | 2 | SD1 | SD2 | SD3 | SD4 |
| Device Control | 3 | F1 | F2 | A1 | A2 |
| Data 1 (4 digit) | 4 | D1 | D2 | D3 | D4 |
| Data 2 (4 digit) | 5 | D1 | D2 | D3 | D4 |
| Reserved | 6 | — | — | — | — |
| Reserved | 7 | — | — | — | — |
| Reserved | 8 | — | — | — | — |
| Reserved | 9 | — | — | — | — |

FIG. 8

| A1 | A2 | Action |
|---|---|---|
| 0 | 0 | No action. |
| 0 | 1 | Transmit current reading of internal 32 bit counter over the air, including logic levels of I/O pins. |
| 0 | 2 | Reset internal 32 bit counter to zero. |
| 0 | 3 | Transmit logic levels (state) of input pins, A and B, over the air. |
| 0 | 4 | Set output pin A high. |
| 0 | 5 | Set output pin A low. |
| 0 | 6 | Set output pin B high. |
| 0 | 7 | Set output pin B low. |
| 0 | 8 | Set both output pins A *and* B high. |
| 0 | 9 | Set both output pins A *and* B low. |
| 1 | 0 | Enter low-power "sleep" mode until woken up by an instruction on the Data Interface. |
| 1 | 1 | Use the block "A" frequencies only. |
| 1 | 2 | Use the block "B" frequencies only. |
| 1 | 3 | Transmit current data buffer contents. |
| 1 | 4 | Clear data buffer. |
| 1 | 5 | Set system preference to Normal mode (first tune to home block, then search alternate block). |
| 1 | 6 | Set system preference to Home only mode (only operate if system is same as stored SID). |
| 1 | 7 | Request Audit response. |
| 1 | 8 | Enable Serving System Detection control (see section on A/B Switching Support). |
| 1 | 9 | Disable Serving System Detection control (see section on A/B Switching Support). |
| 2 | 0 | Enable Module 1 (if disabled by the next action '21'). |
| 2 | 1 | Disable Module 1 (can only be re-enabled by action 20). The Module does not allow the serial Data Interface to request transmissions. However, it will register, and continue to listen to FOCC transmissions, and respond to FMTP device control instructions—particularly the '20' Enable Module 1 instruction. The Module can also be enabled by a serial Data Interface instruction. |
| 2 | 2 | Enable Module 2 (if disabled by the next action '23'). |
| 2 | 3 | Disable Module 2 (can only be re-enabled by action 22). The Module does not allow the serial Data Interface to request transmissions. However, it will register, and continue to listen to FOCC transmissions, and respond to FMTP device control instructions—particularly the Enable Module 2 instruction '22'. The Module cannot be enabled by a serial Data Interface instruction. |
| 2 | 4 | Request a Parameter Update response. |
| 6 | 2 | Initialize the Module ("cold boot"). Resets the counter to zero, sets output pins low and resets the Module. |
| 6 | 3 | Reset the Module ("warm boot"). Saves the counter value, and resets the Module. |

FIG. 9

SYSTEM AND METHOD FOR DISABLING A CELLULAR PHONE

PRIORITY

This application claims the benefit of U.S. Provisional Application No. 60/107,491, filed Nov. 6, 1998.

BACKGROUND OF THE INVENTION

1. Field of the Invention

This invention relates generally to the field of mobile and wireless communication systems. More particularly, the invention relates to an improved system and method for disabling a wireless device over cellular control channels.

2. Description of the Related Art

Cellular Networks

A typical cellular network is illustrated in FIG. 1. Some of the primary components include a group of mobile switching centers 110, 115 (hereinafter "MSCs"); a series of base stations 140–142 and 150–151; and one or more a mobile units 130. Each mobile unit 130 includes an RF module (not shown) for transmitting and receiving cellular signals. The MSCs 110, 115 communicate across an interface 150 to one or more additional networks 120 (e.g., the public switched telephone network).

The mobile station 130 contains a radio frequency ("RF") module (not shown) which allows the mobile station 130 to tune to a particular frequency as designated by the cellular network. The "cell" site is defined by the area (e.g., line 170 in FIG. 1) surrounding each individual base station 140. In operation, each base station 140–142; 150–151 acts as an interface between the MSCs 110, 115 and the mobile stations 130; transmitting and receiving control and voice signals to and from each, respectively.

The MSCs 110, 115 perform the primary control functions for the cellular network, routing calls between the base stations 140–142; 150–151 and other networks 120 and performing a variety of call management operations (e.g., performing testing and diagnostics; monitoring network traffic . . . etc). Two databases are maintained at the MSCs 110, 115 for tracking cellular subscribers: the home location register (hereinafter "HLR") and the visitor location register (hereinafter "VLR").

Every cellular customer belongs to one HLR, which is associated with a particular network provider. Information relating to the customer's account (e.g., subscribed services, account payments) is stored in the HLR along with customer tracking information which identifies the customer's location within the overall cellular network (i.e., either within or outside of the subscribed cellular provider's network).

The VLR keeps track of customers who are operating outside of their cellular provider's network. For example, if MSC 110 and MSC 115 were operated by different service providers and mobile station 130 moved outside of a MSC 110's range (where he was a subscribed) and into MSC 115's range, then MSC 115 would open a VLR entry for the mobile station 130 and would notify MSC 110 (which would then update the HLR for the mobile station 130).

The communication interface between a mobile station 130 and a base station 140 can be broken down into two pairs of channels as illustrated in FIG. 2: a pair of voice channels and a pair of control channels. The two voice channels, the reverse voice channel (RVC") 210 and the forward voice channel ("FVC") 220 carry digital or analog voice signals to and from the mobile station, respectively. The two control channels, the reverse control channel ("RECC") 230 and the forward control channel ("FOCC") 240 carry control signals (e.g., the number to dial, the paging signal indicating an incoming call . . . etc) to and from the mobile station 130, respectively. When the voice channels are not in operation, the mobile station 130 must continually monitor it's designated control channels for event triggers.

Each cellular service provider broadcasts a unique System Identification Number (hereinafter "SID") on its FOCC within the cellular provider's allocated frequency range. Accordingly, a properly equipped cellular telephone can determine which service company is providing service on a given channel by identifying the SID. Usually the SID contains three digits.

At least two identification numbers may be associated with each mobile cellular device: an electronic serial number ("ESN") and a mobile identification number ("MIN"). The ESN is a 32-bit binary number which is set up by the manufacturer at the time of production. It is comprised of a manufacturer code and a serial number. The ESN is typically burned into memory (e.g., ROM) so that circuitry providing the number is secure.

The MIN is a 34-bit number that is derived from 10-digit telephone number of the mobile station. The MIN is comprised of MIN1, 24-bits which correspond to is the station's 7-digit directory number, and MIN2, 10 bits that correspond to the station's 3-digit area code.

Control Channel Packet Transmissions

The assignee of the present application has developed proprietary, two-way, wireless data communications technologies in which data packets known as Remote Access Application Messages ("RAAM"™) or Control Channel Application Data ("CCAD"™) are transmitted over cellular control channels to and from cellular RF modules. See, e.g., U.S. Pat. No. 5,845,203 which is assigned to the assignee of the present application. These data packets enable a variety of new applications beyond traditional cellular voice communications, including monitoring and control of remote devices. These new systems operate completely within, and are transparent to, current established cellular networks, without usurping or compromising the voice-based infrastructure and revenue generation.

Occasionally, a mobile device employing elements of the foregoing technology must be disabled for one reason or another. Under certain conditions, the cellular device should be completely disabled such that it needs to be taken back to the factory before it will function properly again (e.g., car theft applications). In other instances, however, it would be more useful to temporarily disable the device such that it may be enabled locally and/or remotely (or otherwise disabled in a less-severe manner).

Accordingly, what is needed is a system and method for disabling a cellular device using different disabling techniques. What is also needed is a system and method for disabling a cellular device in which the manner in which the device is disabled is based on the application for which the device is employed and/or the underlying facts associated with the act of disabling (e.g., why the device was disabled).

SUMMARY OF THE INVENTION

A method is described for disabling a cellular control module comprising: disabling the cellular control module responsive to either a temporary disable command or a factory disable command received over a cellular control channel; and enabling the cellular control module responsive to an enable command received over the cellular control channel if the cellular control module was disabled by a temporary disable command but not if the cellular control module was disabled by a factory disable command.

Also described is a cellular control module for receiving commands over a cellular control channel comprising: temporary disable logic which disables the cellular control module responsive to a temporary disable command received over the cellular control channel; factory disable logic which disables the cellular control module responsive to a factory disable command received over the cellular control channel; and enable logic which enables the cellular control module responsive to an enable command received over the cellular control channel if the cellular control module was disabled by the temporary disable logic but not if the cellular control module was disabled by the factory disable logic.

BRIEF DESCRIPTION OF THE DRAWINGS

A better understanding of the present invention can be obtained from the following detailed description in conjunction with the following drawings, in which:

FIG. 5 illustrates action values and corresponding actions implemented in one embodiment of the invention.

FIGS. 7 and 8 illustrate command and data functions implemented in one embodiment of the invention.

FIG. 9 illustrates action values and corresponding actions implemented in one embodiment of the invention.

DETAILED DESCRIPTION OF PREFERRED EMBODIMENTS

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

An Exemplary Hardware/Software Architecture

Embodiments of the present invention include various steps, which will be described below. The steps may be embodied in machine-executable instructions. The instructions can be used to cause a general-purpose or special-purpose processor to perform certain steps. Alternatively, these steps may be performed by specific hardware components that contain hardwired logic for is performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

One Embodiment of a System and Method for Locating a Cellular Service

Figure 1:
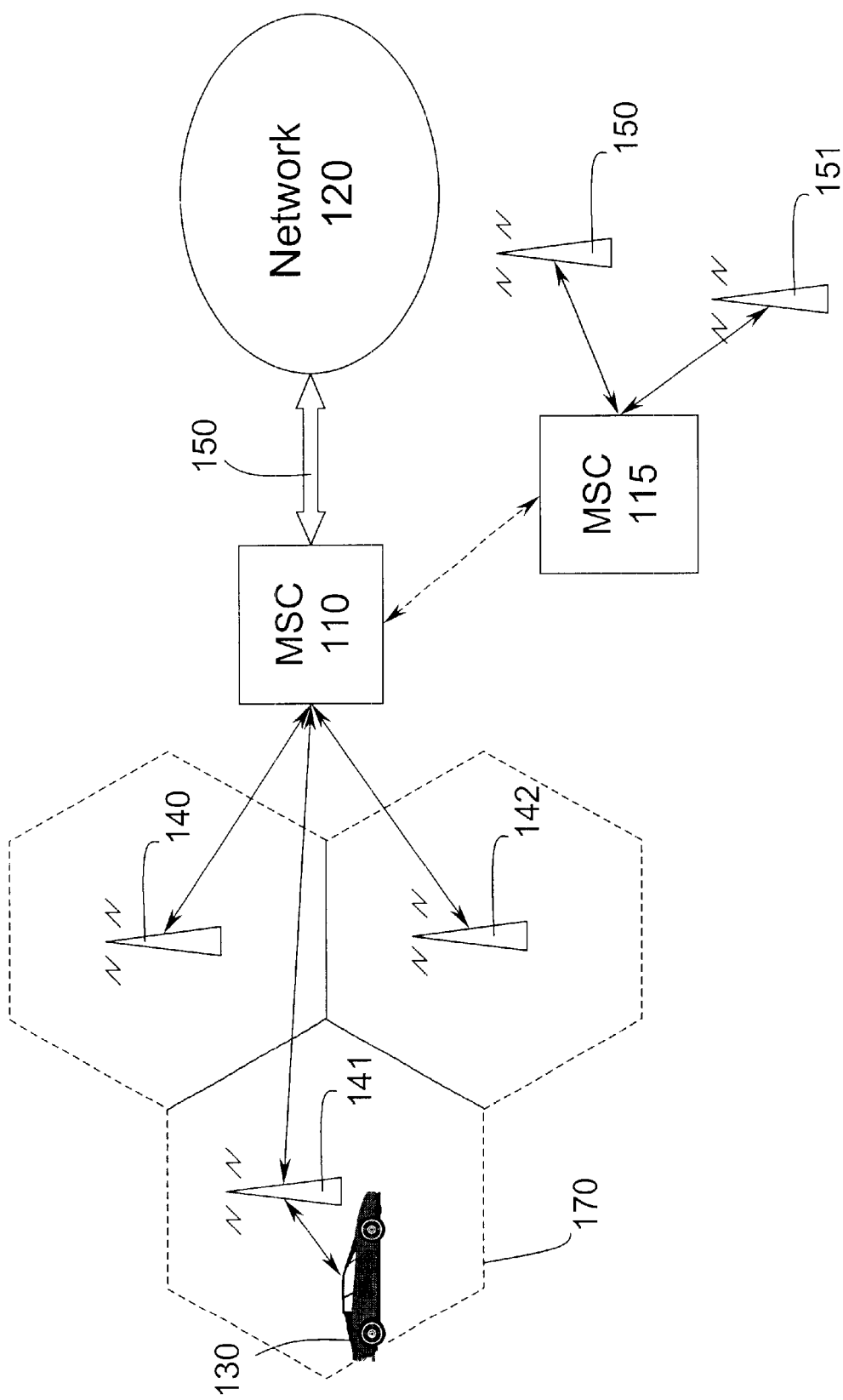
FIG. 1 illustrates a typical cellular network.
Figure 2:
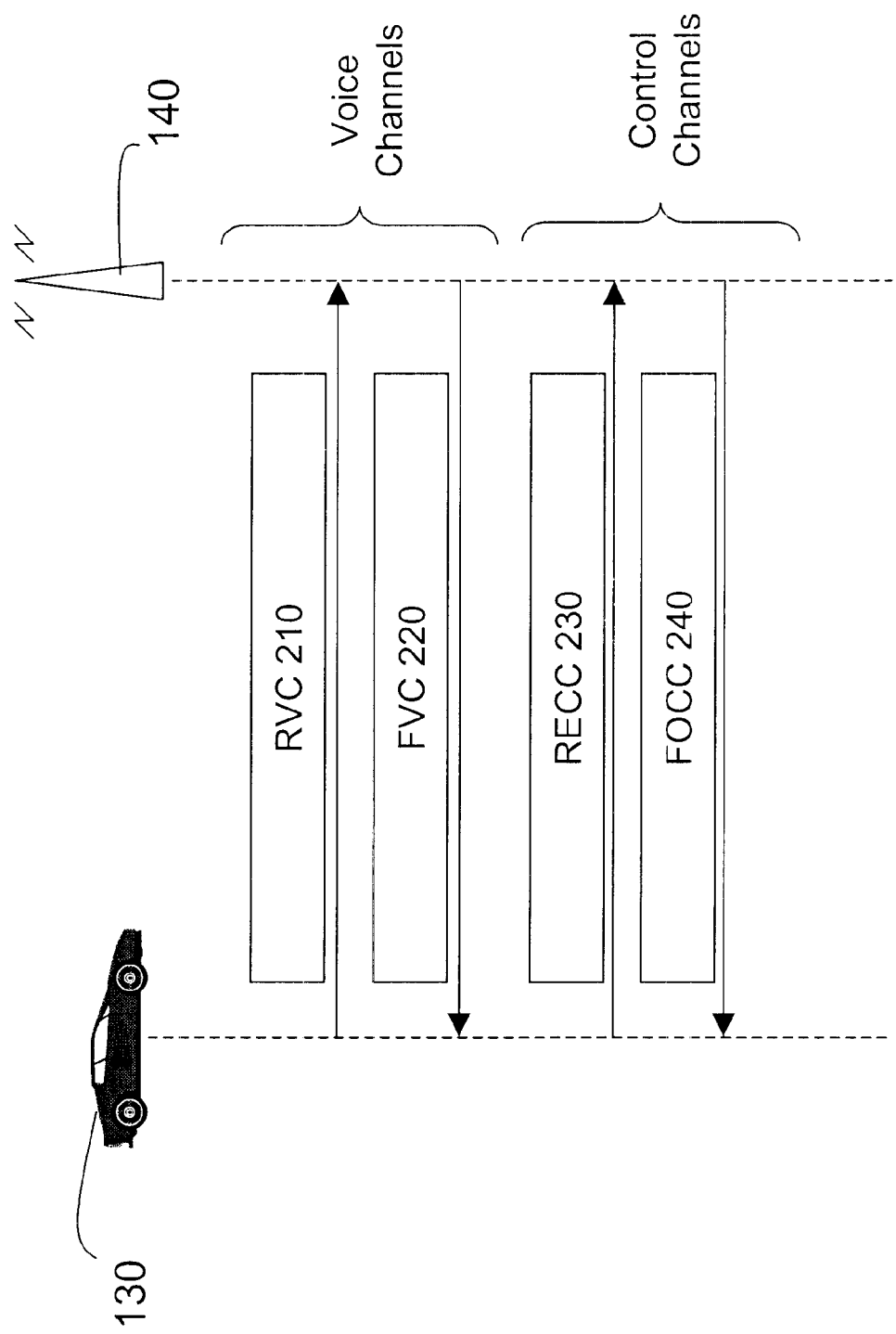
FIG. 2 illustrates the breakdown of voice channels and control channels on a cellular network.
Figure 3:
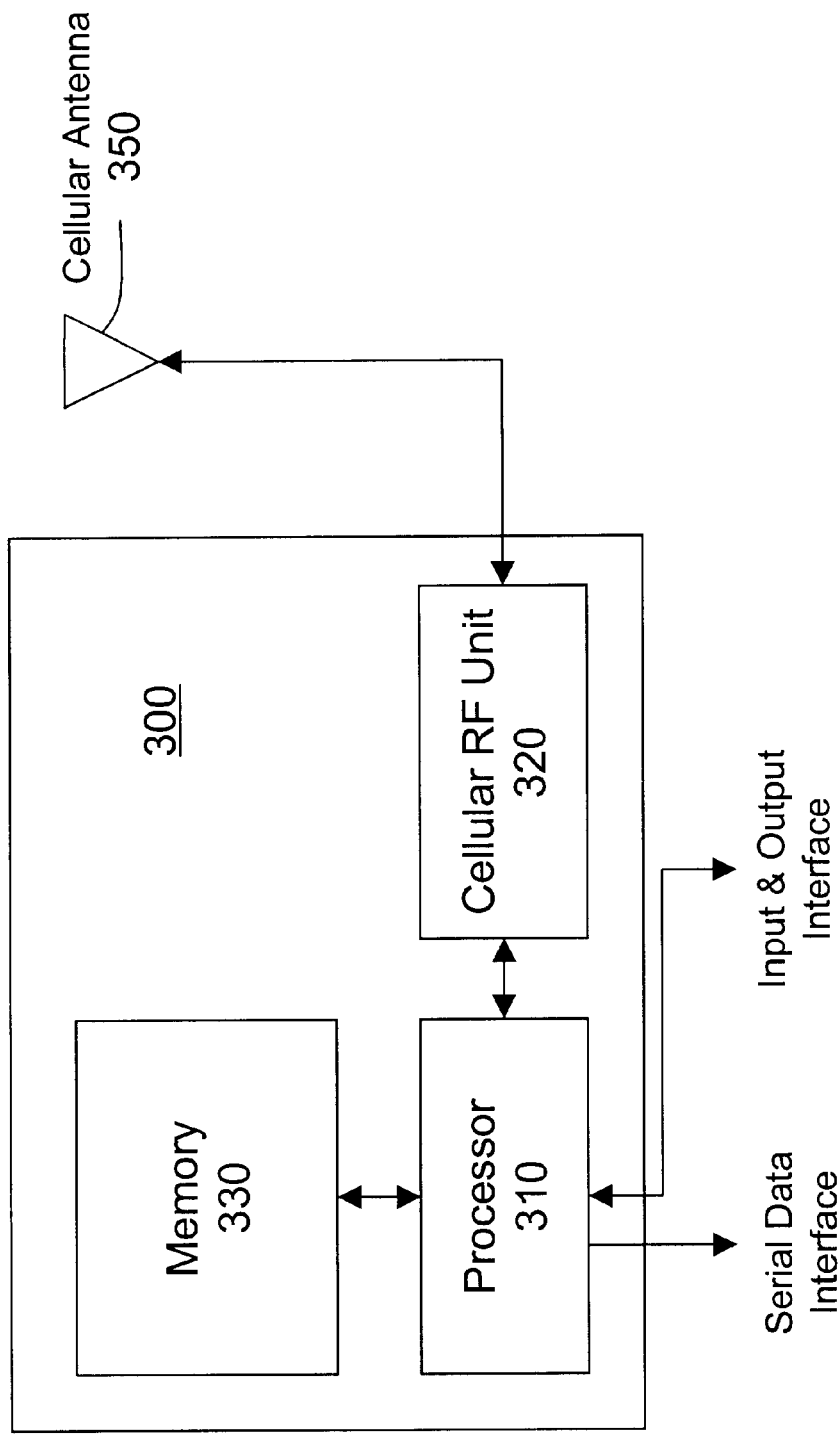
FIG. 3 illustrates a cellular module implemented in various embodiments of the invention.

An exemplary RF module 300 used to implement elements of the system and method is illustrated in FIG. 3. The RF module 300 includes a cellular transceiver unit 320 for transmitting and receiving packetized data over cellular control channels. Also illustrated is a processor 310 which may be a Digital Signal Processor ("DSP"), a general purpose processor or a $\mu$controller. The processor 310 controls the RF module 300 and executes cellular processing instructions/logic. A memory section 330 stores one or more RF module programs and parameters, and may also be used to buffer incoming/outgoing data.

Other elements of the illustrated embodiment of the RF module 300 include a serial connection for transmitting/receiving data/instructions from external devices; power connections; I/O connections; and additional status pins (e.g., service available flags, multiple channel flags, analog signal strength flags, etc).

The RF module 300 in one embodiment transmits and receives short RAAM data packets on control channels in cellular networks using standard (e.g., TIA/EIA-553 and IS-41) signaling mechanisms. The module 300 interfaces with various types of cellular devices (e.g., via its serial data interface) and enables a variety of new applications beyond traditional cellular voice communications. Data packets sent by remote devices in this manner may be transmitted to an HLR over the Signaling System Number 7 (hereinafter "SS7") cellular network for The RF Module is embedded in devices that generate data that may be processed by an HLR and/or transmitted wirelessly to other sites. Some exemplary applications include (among others) security systems, utility meters, vending machines and Global Positioning System ("GPS") units.

In short, for data uplink, the Module:

accepts data packets from external devices on a data interface accepts and counts inputs on general purpose input pins (if available)

encodes the data into a proprietary packet format transmits the encoded packets using cellular Reverse Control Channels (ROCC).

For data downlink, the Module:

responds to event triggers (e.g., cellular pages) on Forward Control Channels ("FOCC")

sends data output through the Data Interface to control external devices outputs analog voltages or digital values on output pins (if available)

To support EIA-553 call processing operation for transmission termination, the Module 300 must listen (and respond) to Forward Voice Channel ("FVC") and Reverse Voice Channel ("RVC"). Accordingly, the cellular RF section of the Module must have the capability to tune to and receive/transmit on voice channel frequencies.

One embodiment of the invention implements IS-91 authentication protocols. Although IS-91 is not technically required, cellular carriers may eventually require these devices to follow the same authentication protocols as other cellular devices that are used for voice service.

Data Encoding

The data encoding into packets is accomplished by the processor 310 on the Module 300 since it has all the pieces required to generate the packets (e.g., MIN, Serial Number, etc). External host controllers may be configured to transmit to the Modules 300 a predetermined minimum or maximum amount of data (e.g., 16 digits) to be encoded and transmitted in a packet. In one particular embodiment, a minimum of 16 digits must be transmitted. If the external controller does not provide 15 digits of data plus a reach-back character ("*") (described in detail below), the Module must not transmit and must report an error to the external host controller.

The Dialed Digits field of one embodiment of the data packet begins with a single "*" digit. This is a remote feature access digit, and the cellular switch thus treats this message as a remote feature access request by a roamer cellular device. Per the requirements of the EIA-553 and IS-41 B standards, the switch routes the call data (in standard IS-41 format) out to the IS-41 network, using SS7 protocols, for verification of features by an HLR. Based on translation table assignments, the network address DPC (Destination Point Code) attached to the data packet causes the IS-41 message to be received at an HLR, a centrally located data processing center that processes the packets. The data contained within the dialed digits field of the packets may then be extracted and executed upon according to the application requirements. For example, the data thus acquired can be transmitted to a local computer system operated by an application service provider.

If not provided by the host controller attached to the RF Module 300, the Module 300 in one embodiment must add the '*' Remote Feature Access Control reach-back character to the data before transmission. If the first digit of the data provided to the Module on the Data Interface is not a '*' the digit may either be changed to a '*' or it may be added in front of the provided data (at the discretion of the Module manufacturer). Alternatively, the Module can report an error on the Data Interface if the leading '*' is not present.

Regardless of the specific implementation selected in support of this requirement, this embodiment of the RF Module must always ensure that a leading '*' is included for any packets that are actually transmitted over the air using the primary MIN of the device.

The Module 300 may also be capable of using the full 31 data digits (32 transmitted digits) possible with extended RECC (also known as "extended dialing") when this feature is available at a given MSC. Since a minimum of 16 digits (including the '*') must be transmitted, if additional digits are provided in the transmit command, the Module 300 will transmit all the provided digits.

However, if more digits are to be sent than the allowed packet size in a given market, the Module may choose to partition the data and transmit in multiple packets. This is not a critical requirement, since it may be very difficult for the Module to determine the digit capacity of the local cellular carrier. Nevertheless, on-board RAM storage for up to 32 digits per data transmission (preferably 64 digits) should be provided.

In one embodiment, all data packet transmissions are right justified in the 15-digit data field (16 digits when including the leading '*'). In addition, when the Module is directly providing the data transmission, for example for reporting the counter value in response to a cellular page, all data must be right justified in the data field. When the Module transmits in this mode, leading '0' digits are inserted in the unused data fields if the data length needed is smaller than the full capacity of the data field.

The broadcast power of the Module should meet broadcast power standards for the cellular telephone industry for Class 1 mobile cellular units: 3 W. Devices transmitting at other power levels (Class 3 at 0.6 W, for example) may also be desirable if the cost trade-off is favorable.

External Host Controller

The Module can operate with or without an external host controller. As described above, a host controller is connected to the serial port Data Interface, and the Module is then under the command of the host (although certain operations described below can still be automatically enabled and triggered by received cellular pages). If an external host controller is not used, many of the commands described below are not applicable since these commands are normally sent using the serial port connection. When there is no external host controller, the Module is still capable of transmitting data when triggered by a cellular page.

Controller Data Commands

One embodiment of the Module 300 must accept various commands on the serial port Data Interface, if available, and provide responses to the received commands. For example, sequences are provided to:

initialize the RF Module ("cold boot")

reset the radio section of the RF Module ("warm boot")

reset the radio section of the RF Module ("warm boot") without clearing the data buffer memory run self-tests and report status report the last command as valid report the last command as invalid report the last command as unknown or unsupported report the status of the RF Module select A or B side frequencies (store in non-volatile memory)

select Home SID Only operation (store in non-volatile memory)

select Normal SID operation (store in non-volatile memory)

select a specific control channel for data transmissions (store in non-volatile memory)

report error conditions clear error conditions accept and buffer data (volatile memory) for later transmission (upon being "polled" with a cellular page for example)

transmit and retain buffered packet in memory (ideally non-volatile)

accept, buffer, transmit packet, and retain in buffer, in one command clear transmit buffer signal if packet transmission is complete signal if packet transmission failed set MIN and two bytes representing "Action" and "Control" bytes (in a table in non-volatile memory—up to 10 MIN with 2 bytes per MIN)

set ESN (in non-volatile memory—factory set only)

set Home SID (in non-volatile memory)

report stored MIN (up to 10 MIN numbers) and Action/Control bytes the Data Interface report stored ESN on the Data Interface report stored Home SID on the Data Interface report when the received SID changes (i.e., is different from stored SID)

signal if cellular service is available/unavailable signal when the RF Module is "polled" (a MIN is dialed), including which MIN and Action/Control bytes transmit the content of an internal 32 bit counter (transmitted data include state of input and output pins since the data capacity is available)

report the content of the internal 32 bit counter on the Data Interface set content of internal 32 bit counter to a specified value clear the contents of internal 32 bit counter report state of input and output pins on the Data Interface (Mandatory if pins are available)

provide output on pins under command of the Data Interface (Mandatory if pins are available)

reset output on pins under command of the Data Interface (Mandatory if pins are available)

accept counts on a dedicated counter pin and update an internal 32 bit counter

In one embodiment, all commands are acknowledged, whether from the RF Module 300 to the external host controller or from the external host controller to the RF Module 300. If the RF Module 300 does not receive an acknowledgment from the external host for any given response, it may repeat the transmission (e.g., for a total of three attempts) before giving up on getting an acknowledgement. The Module 300 may continue to attempt to send data to the external host controller even when acknowledgements are not received.

When the RF Module 300 is operating without an external host controller, some of the above commands will not be applicable—particularly those relating to communications on the Data Interface. Additional capabilities are provided for this mode—although these are not unique and may also be available when an external host controller is used. Thus, depending on the particular embodiment, the RF Module should be able to:

autonomously transmit information when pin changes state Operating without an external host controller requires the ability to respond to events triggered by "polling" on the FOCC, i.e., when a cellular page is received. Thus, when triggered over the air, the RF Module should be able to:

transmit the content of the internal 32 bit counter clear the contents of intern al 32 bit counter transmit state of digital input and output pins provide "high" output on digital output pins provide "low" output on digital output pins reset the radio section ("warm boot")

initialize the RF Module ("cold boot")

select A or B side (store in non-volatile memory)

It is important to note that the event taken upon receipt of a cellular page may be pre-selected by the values stored in the Action and Control bytes associated with a given MIN. This is described in more detail later.

Transmission Data Buffering for Global MINs

If the MIN matching the transmission requirement is a global MIN (i.e., one that applies to all devices), and is set for automatic reporting, all the values (counter, state of pins, etc.) are buffered at the time of the receipt of the cellular page into the transmission buffer. Subsequently, after the automatic delay for transmission, the packet is sent from that buffer, even though it may occur many minutes after the receipt of the cellular page.

Module Transmission Data Formats

Power Up Default Value. Upon power-up, the RF Module of one embodiment is assigned the following data in its transmit buffer:

| Position | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Data | * | 9 | 0 | 0 | 0 | 0 | A0 | A1 | A2 | A3 | A4 | A5 | A6 | A7 | A8 | A9 | where:

'*' Remote Feature Access Control "Reach-Back"Character.

A0–A9 Primary MIN of the RF Module. Immediately after power-up, when the Module receives a transmission request, or the external host controller sends it an initial transmission request without specifying the data, the above default stored in the transmit buffer will be transmitted. Subsequent transmissions may override this default initial value.

RF Module Generated Data Format. This section describes the format to be used for data initiated by the RF Module (see also FMTP Data Protocol below). Whenever the radio is sent a cellular page to report the counter value and state of the I/O pins over the air, or when an autonomous transmission is sent on a state change on an input pin, this format is used for data transmission:

| Position | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Data | * | U | RE | C0 | C1 | C2 | C3 | C4 | C5 | C6 | C7 | C8 | C9 | OP | IP | CP | where:
* Remote Feature Access Control "Reach-Back"Character. This is always a '*' character.
U Unused digit position—must be encoded as a digit '9'.

RE Reason for response. Selected from:

| Digit Value | Reason |
|---|---|
| '0' | Default unknown reason. |
| '1' | Response due to an FMTP request. |
| '2' | A match to a broadcast page (to a slot in the Module MIN). |
| '3' | Input PIN B alarm (if available and when enabled). |
| '4' | Reserved. |
| '5' | Input PIN A power failure alarm (if available and when enabled). |
| '6'–'9' | Reserved. |

C0–C9 Internal counter value, always right justified in the ten-digit field with leading '0' digits as needed.

OP State of output pins (up to three pins A, B and C, if available)

IP State of input pins (up to three pins: A, B and C, if available)

CP State of counter pin. '0'=Low, '1'=High.

The logic state of the input and output pins is coded as follows in the appropriate digit field (OP or IP):

| Digit Value | Pin C | Pin B | Pin A |
|---|---|---|---|
| '0' | Low | Low | Low |
| '1' | Low | Low | High |
| '2' | Low | High | Low |
| '3' | Low | High | High |
| '4' | High | Low | Low |
| '5' | High | Low | High |
| '6' | High | High | Low |
| '7' | High | High | High |

If the Module has fewer than three input (or output) pins, then certain digit values are not applicable. For example, if there are only 2 input pins on the Module 300, digit values '4' through '7' are not possible for the IP data digit field. If the Module 300 has more than three pins, the manufacturer may modify this format to report more or less pins.

Audit Response Format. This section details the transmission for the response to an Audit Request (see also FMTP Data Protocol below). The data is formatted to provide a detectable response, but does not contain any Module 300 status information:

| Position | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Data | * | U | RE | Y | S1 | S2 | N1 | N2 | N3 | O1 | O2 | O3 | X1 | X2 | X3 | X4 | where:

* Remote Feature Access Control "Reach-Back"Character. This is always a '*' character.

U Unused digit position—must be encoded as a digit '9'.

RE Reason for response. Selected from:

| Digit Value | Reason |
|---|---|
| '0' | Default unknown reason. |
| '1' | Response due to an FMTP request. |
| '2' | A match to a broadcast page (to a slot in the Module MIN). |
| '3'–'9' | Reserved. |

Y Specifies that this is an Audit response transmission—must be encode as a digit '2'.

S1–S2 Slot number that matched the MIN. The value '00'states that the data in the MIN fields of this response is the primary MIN of the device. Otherwise '01' through '10'represent the matched MIN slots (or FMTP page value).

N1–N3 Used with O1–O3 and X1–X4, this represents the NPA of the MIN of the page that matched the MIN slot or FMTP address or the primary MIN of the device (see values for S1 and S2).

O1–O3 See above.

X1–X4 See above.

Parameter Response Format. This section details the transmission for the response to a Parameter Response Request (see also FMTP Data Protocol below):

| Position | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Data | * | U | RE | Y | R1 | R2 | T1 | T2 | M | S | I | E | V1 | V2 | V3 | V4 | where:
* Remote Feature Access Control "Reach-Back" Character. This is always a '*' character.

U Unused digit position—must be encoded as a digit '9'.
RE Reason for response. Selected from:

| Digit Value | Reason |
|---|---|
| '0' | Default unknown reason. |
| '1' | Response due to an FMTP request. |
| '2' | A match to a broadcast page (to a slot in the Module MIN). |
| '3'–'9' | Reserved. |

Y Specifies that this is a Parameter response transmission—must be encoded as a digit '3'.

R1–R2 Reserved. May be encoded as digit '0'.

T1–T2 Technology type. Selected from the following list (digit combinations not shown are reserved):

| T1 | T2 | Technology |
|---|---|---|
| '0' | '0' | AMPS. |
| '0' | '1' | IS-95 CDMA only. |
| '0' | '2' | IS-136 TDMA only. |
| '0' | '3' | IS-95 CDMA and AMPS dual-mode. |
| '0' | '4' | IS-136 TDMA and AMPS dual-mode. |
| '1' | '0' | GSM (800 Mhz). |
| '1' | '1' | GSM (1900 Mhz). |

M Miscellaneous settings. When set, the bits of the digit transmitted are interpreted as follows (combinations are allowed):

| Bit position | Meaning |
|---|---|
| 0 | MicroBurst Service Control is enabled. |
| 1 | Authentication is enabled. |
| 3 | Reserved. |

S Carrier Serving System mode setting in the Module. The digit specified is selected from the following table:

| Digit Value | Reason |
|---|---|
| '0' | B only. |
| '1' | A only. |
| '2' | Normal. |
| '3' | Home Only. |
| '4'–'9' | Reserved. |

I Input port configuration status. When set, the bits of the digit transmitted are interpreted as follows (combinations are allowed):

| Bit position | Port Status |
|---|---|
| 0 | Input B alarm transmission enabled. |
| 1 | Input A power fail transmission enabled. |
| 2 | Reserved. |

E Radio enabled status. When set, the bits of the digit transmitted are interpreted as follows (combinations are allowed):

| Bit position | Radio enabled status |
|---|---|
| 0 | HLR disabled. |
| 1 | ASP disabled. |
| 2 | Reserved. |

V1–V4 Radio firmware revision. The radio manufacturer may interpret this in a variety of ways. The recommendation is for a major and minor number with an implied decimal as V1V2.V3V4 (i.e., transmitted digits 0123 represents revision 1.23 of the Module).

Serial Command Format Structure

Binary Byte Stuffed Format. The specific command format for each instruction, the acknowledgment sequence, and the data for each command should be as per the following frame structure:

| SOF | byte count | command | data1 | ... | dataN | Checksum |
|---|---|---|---|---|---|---| where:

SOF Start Of Frame, hex value 0x2 (STX).

byte count One byte value representing the total number of bytes in the packet, not including the SOF byte.

command One byte representing the command or data type being transmitted.

data1–dataN Arguments/data for the command, if required. checksum One byte checksum—the two's complement of the lower 8 bits of the sum of the binary values of all bytes in the packet, not including the SOF and the checksum byte itself.

Byte stuffing may be implemented to reduce the probability of errors in frame synchronization for each packet. A DLE byte, 0×10, will be inserted prior to every STX (0×2) and DLE (0×10) bytes in the data bytes; however, the leading STX byte, indicating start of frame, may not be byte stuffed in this manner. All stuffed DLE bytes are counted as valid bytes for determining the byte count and the pseudo "AT" Command Format.

An alternative to the above binary byte stuffed format is to use a pseudo-AT command set. In this format, the RF Module accepts ASCII commands and data, using a command set similar to typical modem AT command sets. The instruction to the RF Module begins with the letters "AT", followed by character fields that determine the command, followed by the parameters required by the instruction, followed by a carriage-return character. The commands and responses are ASCII characters. Methods for data validation (using checksums, etc.) must still be incorporated to ensure that correct data has been received, and responded to, by the RF Module.

Multiple MIN, and Action/Control Bytes

The RF Module 300 in on embodiment has multiple MIN capability. The Module 300 is used with FOCC event triggering to transmit data, and up to ten MIN numbers (for ten events) may be stored in a table in memory (e.g., non-volatile memory). Each MIN in the table will have an associated Action byte and an associated Control byte. This association is by the slot number, or position, within the table. The Action byte is an unsigned 8-bit value that allows the radio to perform pre-programmed actions based on that value; some of these are predefined and others are for use of the Application Service Provider (i.e., the organization) using the RF Module. The Control byte is an unsigned 8-bit value whose individual bit positions are used to determine the conditions under which the Action byte applies.

Figure 4:
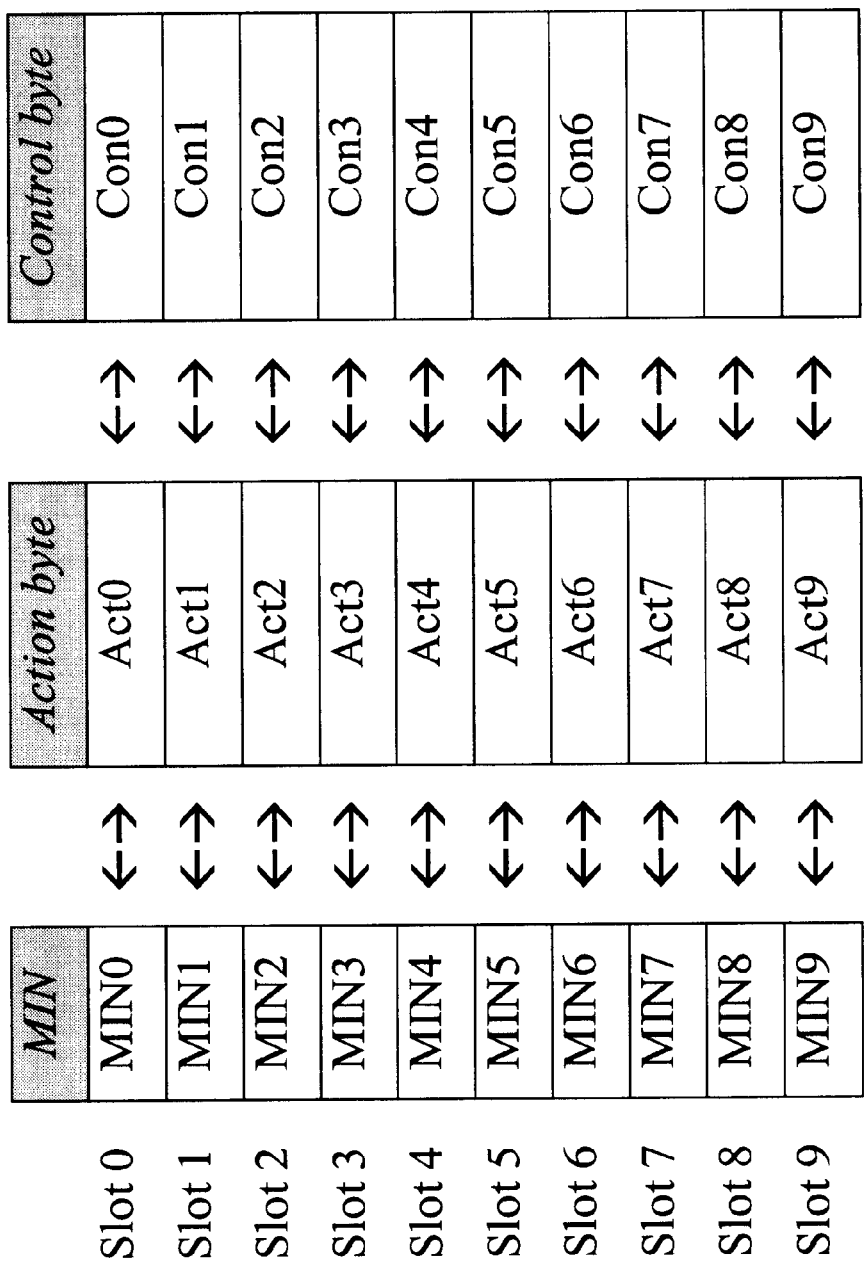
FIG. 4 illustrates a correlation between a mobile identification numbers and actions/controls enacted by a cellular module in embodiments of the invention.

FIG. 4 illustrates MIN numbers, the Action bytes, and Control bytes. Corresponding slots in the tables are always used together to determine the action taken. In other words, Act1 will only apply if MIN1 matches the broadcast cellular paged number, and Con1 is a qualifier for extra control on the behavior of the radio.

Each Action byte value can range from 0 to 255 in the illustrated embodiment since it is an unsigned 8-bit quantity. The range 0 to 63 is reserved for actions to be taken by the RF Module, and values 64 to 255 are available to be utilized by Application Service Providers developing products using the RF Module 300, often under control of an external host controller. The bits in the Control byte are used to determine extra control and reporting when a particular action is taken upon receipt of a cellular page which matches the MIN.

It should be noted that one embodiment of the RF Module responds up to a predefined maximum number of events (e.g., ten) since not all slots in the table need to be filled and active. The Action byte only determines what specific action (of a choice of 256) is to be taken upon receipt of a cellular page that matches the corresponding MIN.

It is also important to note that the Application Service Providers are not prohibited from using the values of 0 to 63; on the contrary, in many cases, these values will be correct for their particular needs, and they should use the value if the action is what they desire. It is merely the definition and actual action (taken by the firmware/software in the RF Module) that is restricted for this number range.

Primary MIN. The MIN stored in Slot 0, or MIN0, in one embodiment is the Primary MIN, or identifier, of the RF Module. When transmitting packets in this embodiment, the MIN0 is always used for the Mobile Identification Number (MIN) field in the packet.

The primary MIN should not be a global MIN—i.e., bit 1 of the control byte for this slot should not be set in normal use. If desired, the radio firmware/software can choose to disallow setting bit 1 for the first MIN slot.

Action Byte. The table illustrated in FIG. 5 lists an exemplary set of actions to be taken by an RF Module when a given MIN is polled. As indicated at action byte values 21 and 23, at least two mechanisms exist for disabling RF modules (listed as "Disable Module 1" and "Disable Module 2," respectively).

Using the "Disable Module 1" feature (i.e. by transmitting an action byte with a value of 21), the Module 300 does not allow the serial Data Interface to request transmissions (i.e., from the host controller). It may, however, register, and continue to listen to FOCC transmissions, and respond to FMTP device control instructions, particularly the "Enable Module 1" instruction generated by action byte 21. The Module in this embodiment may be enabled by a serial Data Interface instruction (e.g., from the host controller).

Using the "Disable Module 2" feature (i.e. by transmitting an action byte with a value of 23), the Module 300 does not allow the serial Data Interface to request transmissions. One primary different here is that the Module 300 cannot be enabled by any serial Data Interface instruction. Thus, the host controller is not capable of enabling the module 300 once it has been disabled using the Disable Module 2 feature. As such, this feature may be more appropriate for high security applications than the Disable Module 1 feature.

Figure 6:
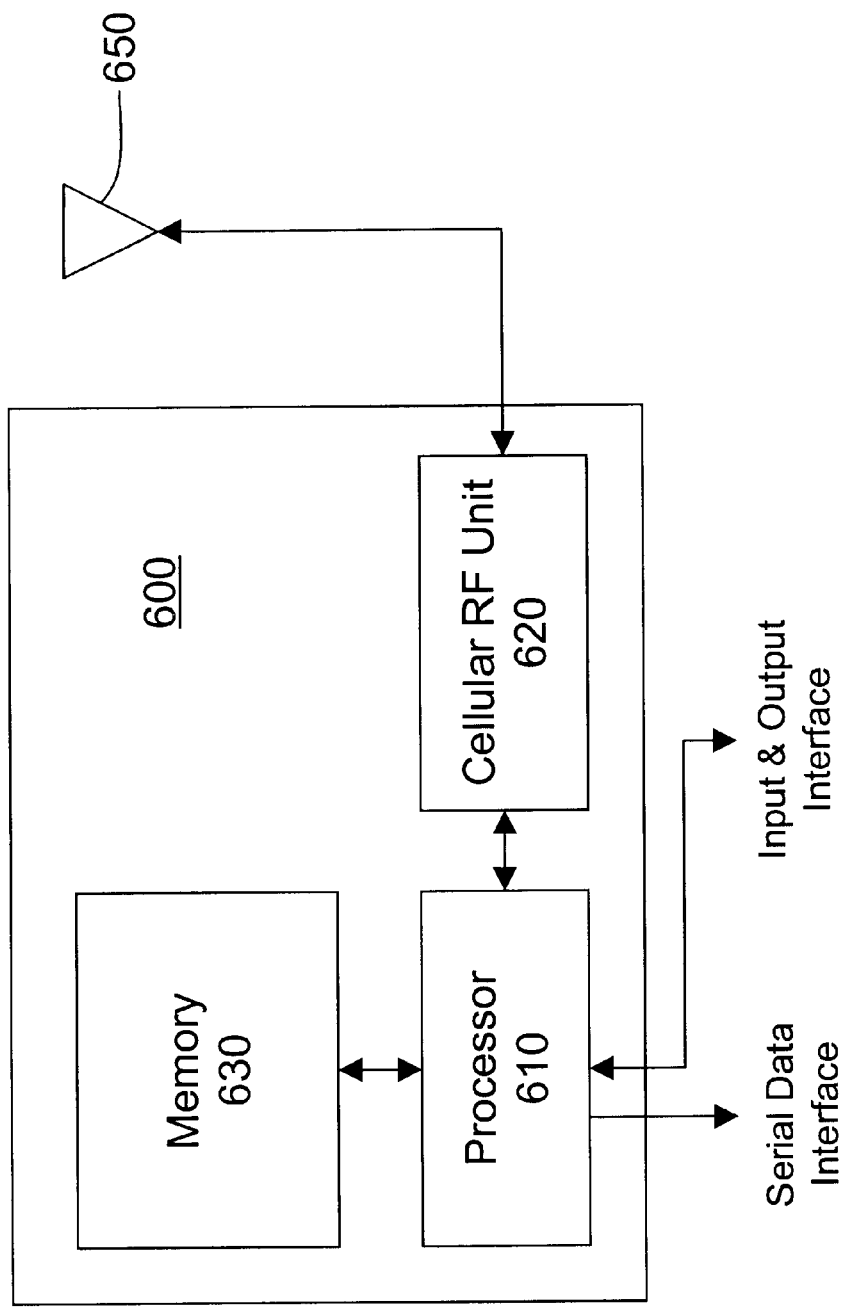
FIG. 6 illustrates control values and corresponding controls implemented in one embodiment of the invention.

Control Byte. The table illustrated in FIG. 6 describes the extra modifiers to be applied to the action taken by the RF Module 300 (as determined by the Action byte). Unlike the actual parameter values shown above in the Action byte, the individual bit values (i.e., 1 or 0) of the Control byte are relevant.

Note that the automatic over-the-air responses for global MIN pages may be delayed for automatic responses. As previously described, in one embodiment, the Module must buffer the counter value and state of pins at the time of receipt of the page—not when finally transmitting the data after the delay. If the Module is connected to an external host controller and the host requests a data transmission while waiting to transmit a scheduled response, this transmit buffer will be overwritten and the automatic response transmission, scheduled for later delivery, will be cancelled.

Min Matches and Wild-Cards. When processing the received FOCC cellular page, the RF Module 300 of one embodiment will start searching for a match with the MIN in Slot 0 (MIN0). If a match occurs, the action represented in the corresponding slot in the Action byte table will be taken. After this action is complete, the RF Module 300 will consider the action complete (without searching the rest of the MIN tables), and then the RF Module 300 will wait for the next cellular page to be received before searching the MIN tables for another match.

FMTP Data Protocol

The Module 300 in one embodiment is capable of responding to Forward Message Transport Protocol (FMTP) messages. This protocol enables an in-band (i.e., the MIN is sent in the pages), multiple-page (minimum of three cellular pages are required—five are possible for the full FMTP protocol) data transmission scheme for enabling certain radio behavior. The MIN transmitted can be a global secondary MIN for the purpose of transmitting the information to more than one RF Module.

The mechanism provides four digits of data in the forward direction, by encoding the target MIN, the command digit and four data digits in a series of three pages. When all the pages are received and decoded, the Module 300 reports the receipt of a successful FMTP page to the application host controller on the serial Data Interface. The Module may directly interpret certain FMTP pages, depending on the command digit value.

The FMTP Page Formats. The format of each of the pages (the slots) in one embodiment and the interpretation of the paged cellular digits received by the Module 300 are as follows:

| Page (Slot) | Digit 01 | Digit 02 | Digit 03 | Digit 04 | Digit 05 | Digit 06 | Digit 07 | Digit 08 | Digit 09 | Digit 10 |
|---|---|---|---|---|---|---|---|---|---|---|
| 1 | M1 | M2 | M3 | F1 | F2 | A1 | C   | D1  | A3  | 0/1 |
| 2 | M1 | M2 | M3 | F1 | F2 | A4 | D2  | A2  | A5  | 2/3 |
| 3 | M1 | M2 | M3 | F1 | F2 | A6 | D3  | D4  | A7  | 4/5 |
| 4 | M1 | M2 | M3 | F1 | F2 | D5 | D6  | D7  | D8  | 6/7 |
| 5 | M1 | M2 | M3 | F1 | F2 | D9 | D10 | D11 | D12 | 8/9 | where:

M1–M3 Identical to the three most significant digits of the MIN being sent the FMTP page. For example, if the primary MIN of the Module is 175, then M1=1, M2=7, M3=5. Note that all the cellular pages of an FMTP transmission have the same M1 through M3 values.

F1–F2 These two digits are the digits denoting the line ranges used for the FMTP protocol. In one particular implementation, F1=9 and F2=9. The Module manufacturer must set this in the Module.

A1–A7 The 7 lower digits of the MIN (the 3 upper digits are assumed to be the same as the M1–M3 values) being sent the FMTP page. The MIN being sent the FMTP page may be a Primary MIN or a secondary MIN.

C Command digit ('0' through '9'). The interpretation of this digit is described shortly.

D1–D4 Data digits ('0' through '9'). The interpretation of these digits depends on the value of the command digit.

D5–D12 Data digits ('0' through '9'). The interpretation of these digits depends on the value of the command digit—it should be noted that the 8 and 12 digit sequences are not currently available to the Application Service Provider.

The least significant digit of the page (shown as Digit 10 in the above table) will determine the specific page slot being sent. For Modules listening to the even MIN stream on the FOCC, digits 0, 2, 4, 6 and 8 will be used. For Modules listening to the odd MIN stream, digits 1, 3, 5, 7 and 9 will be used for this digit field.

Commands and Data Messages. Illustrated in FIG. 7 are FMTP commands and data messages which are provided for the full eight and twelve digit data embodiments. The following functions apply:

Command A single digit representing the specific command to be executed. With the exception of the Factory Disable and Device Control subsets of the Device Control command, all received commands and values are sent to the host controller on the Data Interface (if one is attached). The Device Control command is directly used by the RF Module (to disable/enable operation as directed by the data parameters.) The command digits '8' and '9' are shown as reserved. However, as mentioned above, the radio must simply pass the received message to the external host controller on the Data Interface—an application interpretation for these commands will be provided.

H1–H2 Hour. From '00' to '23' (however, the full '00' to '99' range is allowed.) Also see next field description.

M1–M2 Minutes. From '00' to '59' (however, the full '00' to '99' is allowed.) The Module can store the time (in an internal real time clock, for example, if it is available), but the primary intention of this command is to send the information through to an external host controller via the Data Interface. In this case, the application can interpret the digits as desired.

MO1–MO2 Month. From '01' to '12' (however, the full '00' to '99' is allowed.) Also see next field description.

DY1–DY2 Day. From '01' to '31' (however, the full '00' to '99' is allowed.) The Module can store the date (in an internal real time clock, for example, if it is available), but the primary intention of this command is to send the information through to an external host controller via the Data Interface. In this case, the application can interpret the digits as needed. The RF Module 300 is "Year 2000" compliant since it does not store date or time. If application level "Year 2000" compliance is desired, the external host controller and/or application must implement "Year 2000" compliance.

SD1–SD4 New Home SID to be set in the RF Module. The data sent in this field is the low 13 bits of the SID only, excluding the country code, encoded as four decimal digits.

F1–F2 Factory Disable. RF Modules disabled in this manner require "return to factory" to enable and is strictly intended for serious disasters (e.g., stolen Modules, "runaway" applications . . . etc). A transmitted value of '9' for F1, '8' for F2, and checksum values for A1 and A2 (as described below), disables the RF module. When this disable command is received, the Module will not operate (Module will not register or transmit on the RECC or listen to the FOCC) and must be returned to the manufacturer for "repair." When F1 and F2 are both '0', the Factory Disable command does not apply and the values in A1 and A2 are used to perform specific actions (as described below).

D1–D12 Data digits. Numeric values only in the range '0' through '9' for each digit. The "ASP Data" command is used by the Application Service Provider to send data to the Module and the "HLR Data" command is used by the HLR to send data to the Module (for future use.) Note that D5 through D12 are not available in all the FMTP messages described here.

In a four digit embodiment, the FMTP commands and data messages illustrated in FIG. 8 are available (the interpretation of the digit fields are as described above).

The table illustrated in FIG. 9 identifies the actions performed by one embodiment of the Module 300 upon receiving a Device Control FMTP page that is not a Factory Disable (i.e., the command digit is '3', and the data digits field begin with the digits '0' and '0'). It should be noted that this embodiment of a device control table corresponds to the action byte table (see, e.g., FIG. 5) associated with each MIN. As before, some of the actions are not possible if the Module 300 is not equipped with the appropriate number of pins, etc.

FMTP Timer Interval. When a cellular page is received in one embodiment, and the five most significant digits of the paged MIN matches the device NPA, the FMTP timer will be started and the Module will wait for the next FMTP message. This FMTP timer duration will be programmable via the serial Data Interface and stored in non-volatile memory. This duration can be changed from 5 to 120 seconds, with a factory default setting of 30 seconds.

The Module 300 will re-start the timer after each FMTP page is received. If the timer expires, all received FMTP Pages will be cleared from the buffer memory of the Module, and the timer will not start again until it receives a new FMTP page.

Before expiring, the timer of this embodiment can be turned off given the following conditions:

All the FMTP pages have been received and the Module has decoded the complete FMTP message being sent.

An FMTP page has been received and it occupies the same page slot location of an existing FMTP page. This is an error condition and all previous FMTP pages will be deleted from memory, and the new FMTP page will be saved in the slot location. The timer will then be re-started.

When the Module receives three FMTP pages that fill slots 1, 2 and 3, the Module will check for a complete message based on the command digit. If the message is complete (i.e. the command digit is not '6' or '7' meaning that there should be additional pages for slots 4 and/or 5), the timer will be canceled and the Module will process the FMTP message if the MIN encoded in the message matches the Module primary or secondary MIN.

When using this sequence of timer events and FMTP page slots, the following conditions are true:

The multiple pages for an FMTP message can arrive at the radio in any order. The Module stores them in the correct page slot based on value of the least significant digit of the paged MIN.

The timer waits 30 seconds for each page, but the receipt of the "final" one (third for the 3 page sequence, fourth in the 4 page sequence, and fifth in the 5 page sequence) will immediately reset the timer so that it is ready to listen for new FMTP pages. Generally, this allows the multiple page sequences to be sent in batches sooner than 30 seconds apart. In one embodiment this separation of FMTP pages can be reduced below 30 seconds without impact, as long as the Module immediately resets the timer upon receipt of the "final" page.

FMTP Page Duplication Filter. All received pages received by the Module that match the primary or secondary MIN's of the Module should be saved in "duplication filter" buffers. In the various AMPS cellular carrier markets, the pages are usually sent in pairs (one local page and one global/zone page). The duplication filter prevents the Module from recognizing the same page twice—a timer for the filter must elapse before the duplicate page is considered to be a separate event. This is particularly important for the FMTP protocol to prevent the page slots from being cleared too quickly. The value for timer must range from 10 to 15 seconds and programmable via the serial Data Interface, with a default of 10 seconds.

FMTP Factory Disable Checksum Calculation. In one embodiment, when the Module 300 is sent a Factory Disable (e.g., when the command digit is '3' and the first two digits of the data field are '9' and '8'), the final two digits of the data field calculated with a unique process to ensure that accidental disables do not occur. This section describes the method to be used for calculating the checksum to see if the Module 300 should obey the Factory Disable command.

This process is actually relatively simple to execute in code—the purpose of the method is to prevent accidental invocation of the Factory Disable capability. As can be imagined, the result of operating on the instruction is rather drastic, and it should be used with great care.

Step 1. The least significant 7 digits of the Primary MIN (i.e., discarding the NPA) and the least significant 7 digits of the ESN (i.e., discarding the Manufacturer code) are identified as follows:

N1–N3 The "office code" of the Primary MIN. For example, if the Primary MIN is 175-421-1710, then N1=4, N2=2 and N3=1.

X1–X4 The least significant four digits of Primary MIN. For example, if the MIN is 175-421-1710, then X1=1, X2=7, X3=1 and X4=0.

E1–E7 The least significant 7 digits of the ESN of the device.

For example, if the ESN is 123-0264067, then E1=0, E2=2, E3=6, E4=4, E5=0, E6=6 and E7=7.

Step 2. The above digits are accessed sixteen times in a specific pattern (identical pattern each time) to extract digits from the Primary MIN and ESN. Each initial value is the result of taking digits in pairs. The pattern for each access is as follows:

| Access | 1st | 2nd | 3rd | 4th | 5th | 6th | 7th | 8th | 9th | 10th | 11th | 12th | 13th | 14th | 15th | 16th |
|---|---|---|---|---|---|---|---|---|---|---|---|---|---|---|---|---|
| High digit | E1 | E6 | E7 | X4 | X3 | X3 | E4 | E7 | X3 | X2 | X1 | E6 | E4 | E3 | E2 | X2 |
| Low digit | N1 | X2 | N2 | N3 | E3 | E3 | X4 | X4 | E6 | E5 | E4 | E7 | X4 | N2 | E1 | X1 |

For example, with the Primary MIN of 175-421-1710, and an ESN of 123-0264067, the calculations for the initial values are as follows:

| Access | 1st | 2nd | 3rd | 4th | 5th | 6th | 7th | 8th | 9th | 10th | 11th | 12th | 13th | 14th | 15th | 16th |
|---|---|---|---|---|---|---|---|---|---|---|---|---|---|---|---|---|
| High digit | E1 | E6 | E7 | X4 | X3 | X3 | E4 | E7 | X3 | X2 | X1 | E6 | E4 | E3 | E2 | X2 |
| Low digit | N1 | X2 | N2 | N3 | E3 | E3 | X4 | X4 | E6 | E5 | E4 | E7 | X4 | N2 | E1 | X1 |

-continued

| Access | 1st | 2nd | 3rd | 4th | 5th | 6th | 7th | 8th | 9th | 10th | 11th | 12th | 13th | 14th | 15th | 16th |
|---|---|---|---|---|---|---|---|---|---|---|---|---|---|---|---|---|
| Initial values | 04 | 67 | 72 | 01 | 16 | 16 | 40 | 70 | 16 | 70 | 14 | 67 | 40 | 12 | 20 | 71 |

In the above example, in access 1, the E1 digit is '0' and the N1 digit is '4'. Hence, the initial value is '04'. In access 2, the E6 digit is '6' and the X2 digit is '7'. Hence, the initial value is '67'. In access 3, the E7 digit is '7' and N2 digit is '2'. Hence the initial value is '72' . . . etc.

Step 3. These initial values are then multiplied by a "Multiplier" (distinct but identical for each access) to randomize the result, and the lower two digits (i.e., modulo 100) of each result are noted. The multipliers for each access are hard-wired in one embodiment as follows:

| Access | 1st | 2nd | 3rd | 4th | 5th | 6th | 7th | 8th | 9th | 10th | 11th | 12th | 13th | 14th | 15th | 16th |
|---|---|---|---|---|---|---|---|---|---|---|---|---|---|---|---|---|
| Multipler | 3 | 5 | 7 | 9 | 1 | 3 | 7 | 9 | 3 | 5 | 3 | 7 | 7 | 9 | 5 | 3 |

For example, with the Primary MIN of 175-421-1710, and an ESN of 123-0264067, the calculations for the values are as follows:

| Access | 1st | 2nd | 3rd | 4th | 5th | 6th | 7th | 8th | 9th | 10th | 11th | 12th | 13th | 14th | 15th | 16th |
|---|---|---|---|---|---|---|---|---|---|---|---|---|---|---|---|---|
| High digit | E1 | E6 | E7 | X4 | X3 | X3 | E4 | E7 | X3 | X2 | X1 | E6 | E4 | X3 | E2 | X2 |
| Low digit | N1 | X2 | N2 | N3 | E3 | E3 | X4 | X4 | E6 | E5 | E4 | E7 | X4 | N2 | E1 | X1 |
| Initial values | 04 | 67 | 72 | 01 | 16 | 16 | 40 | 70 | 16 | 70 | 14 | 67 | 40 | 12 | 20 | 71 |
| Multiplier | 3 | 5 | 7 | 9 | 1 | 3 | 7 | 9 | 3 | 5 | 3 | 7 | 7 | 9 | 5 | 3 |
| Multiplied values | 12 | 35 | 04 | 09 | 16 | 48 | 80 | 30 | 48 | 50 | 42 | 69 | 80 | 08 | 00 | 13 |

In the above example, with access 1, the El digit is '0' and the N1 digit is '4'. Hence, the initial value is '04'. This is multiplied by the access multiplier of '3'resulting in a value of '12'. In access 2, the E6 digit is '6' and the X2 digit is '7'. Hence, the initial value is '67'. This is multiplied by the access multiplier value of '5', resulting in '335', whose lowest two digits are taken—hence the multiplied value is '35'. In access 3, the E7 digit is '7' and N2 digit is '2'. Hence the initial value is '72'. This is multiplied by the access multiplier of '7', resulting in '504', whose lowest two digits are taken—hence the multiplied value is '04' . . . etc.

Step 4. The resulting sixteen multiplied value numbers are added and the lowest two digits (i.e., modulo 100) becomes the two digits that are sent in the FMTP digit positions for the checksum. In the above example, the lowest two digits of the sum of the sixteen "Multiplied values" shown, are '4' and '4'. Thus the FMTP page to the above device sends the command digit '3' and data digits of '9844'—this Factory Disables the device.

Call Processing

The following describes the overall transmission call process implemented in one particular embodiment of the invention (obeying the requirements of EIA-553 processing):

The Module initiates a call origination, with a "reach-back"character in the first digit location. This is effectively a remote feature access request.

The Module waits for a voice-channel designation.

Upon receipt of a voice-channel designation, the Module tunes to the voice-channel.

The Module transmits SAT for 50 milliseconds, selectable from 50 to 100 ms in 5 ms steps (value stored in non-volatile memory).

The Module transmits SAT for 1000 milliseconds.

The Module transmits a call terminate (audio tone) for 1.8 seconds.

The Module reports a call transmission success to the attached host controller.

Frequency of Control Channels

The RF Module 300 in one embodiment must be capable of operating on both block A and block B carrier frequencies, stored as a parameter (like a normal cell-phone) in non-volatile memory. It must be also capable of scanning the standard cellular control channels to use what channels are available at the site where it is used to transmit data.

General Specifications

Power supply requirements are flexible. For example, devices with lower supply currents, both at idle and during transmission, are entirely acceptable. Lower supply voltages, such as 5 Volt DC, can also be considered; however, these may encounter nominal difficulty with simple automotive applications since they would require external voltage regulators.

Serial Data/control Interface. If a serial Data Interface is provided in one embodiment, use of the interface protocol below can be used. However, the CMOS logic level may be replaced with RS-232 levels.

| Parameter | Ratings | Units |
|---|---|---|
| Logic levels | 5 | Volts, CMOS |
| Serial data type | Asynchronous | |
| Data direction | Full duplex | |
| Start bits | 1 | |
| Data bits | 8 | |
| Stop bits | 1 | |
| Parity | None | |
| Transmission rate | 9600 | bps |
| Handshaking | None | |

Moreover, additional baud rates or different logic levels are also possible: 1200, 2400, and 4800 bps as well as RS-232 logic levels may be implemented.

Throughout the foregoing description, for the purposes of explanation, numerous specific details were set forth in order to provide a thorough understanding of the invention. It will be apparent, however, to one skilled in the art that the invention may be practiced without some of these specific details. For example, although described in the context of a system which uses cellular control channels to transmit packetized data, the underlying invention is not limited to such a system. Accordingly, the scope and spirit of the invention should be judged in terms of the claims which follow.

What is claimed is:

1. A radio frequency (RF) module which receives commands over a cellular control channel and which communicates with a host controller over a data interface, the RF module comprising:
    a processor;
    a memory to store a first instruction corresponding to a first disable command received over said cellular channel, which, when executed by said processor, causes said processor to disable said RF module such that said RF module may be enabled by said host controller; and
    said memory to store a: second instruction corresponding to a second disable command received over said cellular channel, which, when executed by said processor, causes said processor to disable said RF module such that said RF module may not be enabled by said host.

2. The RF module as claimed in claim 1 wherein said first and second disable commands are embodied in first and second mobile identification numbers, respectively, and wherein said RF module receives and processes multiple MINs.

3. The RF module as claimed in claim 1 wherein said first instruction, when executed by said processor, causes said processor to disable said RF module such that said RF module may be enabled by an enable command received over said cellular control channel.

4. The RF module as claimed in claim 1 wherein said second instruction, when executed by said processor, causes said processor to disable said RF module such that said RF module may be enabled by an enable command received over said cellular control channel.

5. The RF module as claimed in claim 1 wherein said memory stores a factory disable instruction corresponding to a factory disable command received over said cellular channel, which, when executed by said processor, causes said processor to disable said RF module such that said RF module may not be re-enabled by either said host controller or said enable command received over said cellular control channel.

6. The RF module as claimed in claim 1 wherein the memory to store an instruction, which, when executed by said processor, causes said processor to disable said RF module such that said RF module may not be enabled by said host controller includes said host controller to perform a checksum calculation to ensure that said second disable command was properly transmitted.

7. The RF module as claimed in claim 1 wherein said first and second disable commands received and interpreted by said RF module are formatted in the Forward Message Transport Protocol ("FMTP").

8. A cellular control module for receiving commands over a cellular control channel comprising:
    temporary disable logic to disable said cellular control module responsive to a temporary disable command received over said cellular control channel;
    factory disable logic to disable said cellular control module responsive to a factory disable command received over said cellular control channel; and
    enable logic coupled with the first disable logic to enable said cellular control module responsive to an enable command received over said cellular control channel if said cellular control module was disabled by said temporary disable logic but not if said cellular control module was disabled by said factory disable logic.

9. The cellular control module for receiving commands over a cellular control channel as claimed in claim 8 wherein said temporary disable logic further comprises:
    first temporary disable logic to disable said cellular control module responsive to a first temporary disable command received over said cellular control channel;
    second temporary disable logic to disable said cellular control module responsive to a second temporary disable command received over said cellular control channel; and
    wherein said enable logic to enable said cellular control module responsive to an enable command received over a data interface with a host controller if said cellular control module was disabled by said first temporary disable logic but not if said cellular control module was disabled by said second temporary disable logic.

10. The cellular control module for receiving commands over a cellular control channel as claimed in claim 8 wherein said factory disable command includes a checksum calculation to ensure that said factory disable command was properly transmitted.

11. The cellular control module for receiving commands over a cellular control channel as claimed in claim 8 wherein said temporary disable and factory disable commands received and interpreted by said cellular control module are formatted in the Forward Message Transport Protocol ("FMTP").

12. The cellular control module for receiving commands over a cellular control channel as claimed in claim 8 wherein said temporary disable and factory disable commands are embodied in first and second mobile identification numbers, respectively, and wherein said cellular control module receives and processes multiple MINs.

13. A method for disabling a cellular control module comprising:
    disabling said cellular control module responsive to one of a temporary disable command that causes a temporary disabled condition and a factory disable command that causes a factory disabled condition, received over a cellular control channel; and enabling said cellular control module responsive to an enable command received over said cellular control channel if said cellular control module was disabled by said temporary disable command but not if said cellular control module was disabled by said factory disable command.

14. The method as claimed in claim 13 wherein disabling said cellular control module responsive to said temporary disable command comprises disabling said cellular control module with one of a first temporary disable command and a second temporary disable command, and wherein enabling said cellular control module responsive to an enable command comprises enabling said cellular control module with a host controller if said cellular control module was disabled by said first temporary disable command but not if said cellular control module was disabled by said second temporary disable command.

15. The method for disabling a cellular control module as claimed in claim 13 including the step of performing a checksum calculation on said factory disable command to ensure that said factory disable command was properly transmitted.

16. The method for disabling a cellular control module as claimed in claim 13 wherein said temporary disable and factory disable commands received and interpreted by said cellular control module are formatted in the Forward Message Transport Protocol ("FMTP").

17. The method for disabling a cellular control module as claimed in claim 13 wherein said temporary disable and factory disable commands are embodied in first and second mobile identification numbers, respectively, and wherein said cellular control module receives and processes multiple MINs.

18. A method for disabling a cellular control module comprising:

receiving a command over a cellular control channel having a MIN associated therewith;

temporarily disabling said cellular control module if said MIN corresponds to a temporary disable instruction;

permanently disabling said cellular control module if said MIN corresponds to a permanent disable instruction; and enabling said cellular control module responsive to an enable command received over said cellular control channel if said cellular control module was temporarily disabled but not if said cellular control module was permanently disabled.

19. The method for disabling a cellular control module as claimed in claim 18 wherein said enable command has a particular MIN associated therewith.

20. The method for disabling a cellular control module as claimed in claim 18 wherein enabling said cellular control module responsive to an enable command comprises enabling said cellular control module if said cellular control module was disabled by said first temporary disable instruction but not if said cellular control module was disabled by said second temporary disable instruction, and wherein said first and second temporary disable instructions are transmitted over said cellular control channels with different MINs associated therewith.

21. The method for disabling a cellular control module as claimed in claim 18 including the step of performing a checksum calculation on said permanent disable instruction to ensure that said permanent disable instruction was properly transmitted.

* * * * *